United States Patent  [15] 3,665,544
Sakamoto  [45] May 30, 1972

[54] WINDSHIELD WIPER FOR VEHICLES

[72] Inventor: Kashira Sakamoto, 12, Tennocho-7-chome, Kariya, Japan

[22] Filed: Aug. 24, 1970

[21] Appl. No.: 66,294

[30] Foreign Application Priority Data

Dec. 27, 1970  Japan.....................................45/1167
Dec. 27, 1970  Japan.....................................45/1168
Mar. 20, 1970  Japan...................................45/23976
Mar. 23, 1970  Japan...................................45/24292

[52] U.S. Cl......................15/250.42, 15/250.32, 15/250.35
[51] Int. Cl.............................................................B60s 1/32
[58] Field of Search..........15/250.42, 250.15, 250.2, 250.21, 15/250.32, 250.34, 250.35, 250.36, 250.33

[56] References Cited

UNITED STATES PATENTS 1,982,624  12/1934  Barker................................15/250.21
3,427,637  2/1969   Quinlan et al. ....................15/250.42
2,799,887  7/1957   Nemic................................15/250.35
3,040,359  6/1962   Deibel................................15/250.36
2,094,732  10/1937  Anderson.......................15/250.3 X

FOREIGN PATENTS OR APPLICATIONS

795,075  5/1958   Great Britain......................15/250.42
964,139  7/1964   Great Britain......................15/250.42
940,214  10/1963  Great Britain......................15/250.42

Primary Examiner—Peter Feldman
Attorney—Cushman, Darby & Cushman

[57] ABSTRACT

In a windshield wiper for vehicles, yoke members are directly fixed to an arm. At least one of the yoke members comprises two sections between which is loaded a spring so as to normally bias the two sections and therefore a blade toward the windshield. Alternatively, a spring may be loaded between the arm head and arm piece which may comprise two bar-shaped members. Even when the windshield is curved, the blade may be uniformly pressed against it. A number of pivotal connection members is reduced so that less noise is produced. Since a number of components is reduced, the assembly is much facilitated at less cost.

6 Claims, 26 Drawing Figures

PATENTED MAY 30 1972

INVENTOR
Kashiro Sakamo
BY Cushman, Darby & Cushman
ATTORNEYS

WINDSHIELD WIPER FOR VEHICLES

The present invention relates to a windshield wiper for automobiles and the like and more particularly to an improvement of the wiper arm and blade assemblies thereof.

In general, the typical prior art windshield wiper comprises an arm assembly which comprises an arm piece fixed to a retainer which in turn is rotatably fixed to an arm head, and a blade assembly comprising a first connection member having second connection members rotatably fixed to both ends thereof respectively, a blade made of an elastic material such as rubber which is carried by a resilient member which in turn is carried slidably by the second connection members, and a clip rotatably fixed to said first connection member for coupling the blade assembly with the arm assembly.

The first and second connection members of the blade assembly and the arm piece of the arm assembly are located in relatively closer relation with each other so that the air resistance of the arm and blade assemblies becomes greater. Especially when a vehicle is travelling at high speed, the blade assembly tends to be spaced apart from the windshield, so that the wiping efficiency is lowered. Furthermore, the prior art windshield wiper has a large number of pivotal connection members for example between the first and second connection members, between the first connection member and the clip, and so on, so that a greater noise tends to be produced in operation.

Furthermore, the arm assembly is coupled with the blade assembly at only one point, that is through the clip, a concentration of force tends to occur at this joint, so that the unbalanced motions of the arm and blade assemblies tend to occur. Especially from the connection between the clip and the arm piece, the greater noise tends to be produced. Since the first and second connection members and the arm piece are located in relatively closely spaced apart relation with each other as explained above, the driver's view tends to be adversely limited. A number of components of the prior art windshield wiper is greater so that the assembly becomes complex and the cost becomes also higher.

The present invention has been made in order to overcome the above described problems. At least two yoke members for attaching a blade are directly fixed to the arm assembly so that the construction becomes simple and the air resistance may be reduced. Therefore, the blade is effectively prevented from being moved away from the windshield, the assembly is much facilitated, the cost is lowered, the noise is minimized, the concentration of the force at the joints may be minimized and the driver's view is much improved.

Furthermore, at least one of the yoke members is divided into two sections between which is loaded a spring so as to normally bias the two sections toward the windshield, so that even when the windshield is curved, the blade may be pressed against the windshield with uniform pressure.

The present invention will become more apparent from the following description of the illustrative embodiment thereof taken in conjunction with the accompanying drawing.

FIGS. 13 - 18 illustrates a seventh embodiment of the present invention,

FIGS. 19 to 22 are views illustrating an eighth embodiment of the present invention;

Figure 1:
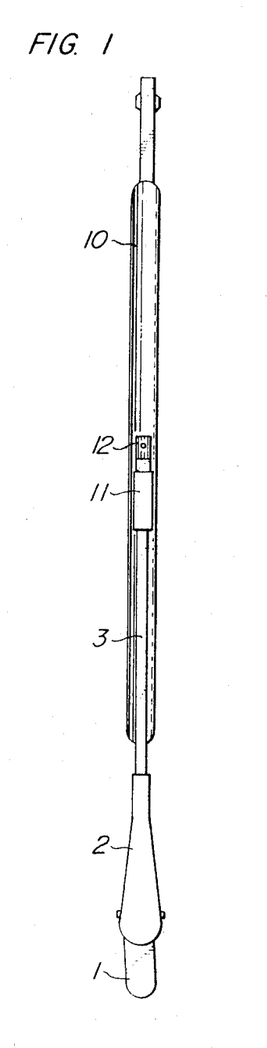
FIGS. 1 and 2 are top and front views of the typical prior art windshield wiper respectively for comparison with that of the present invention.
Figure 2:
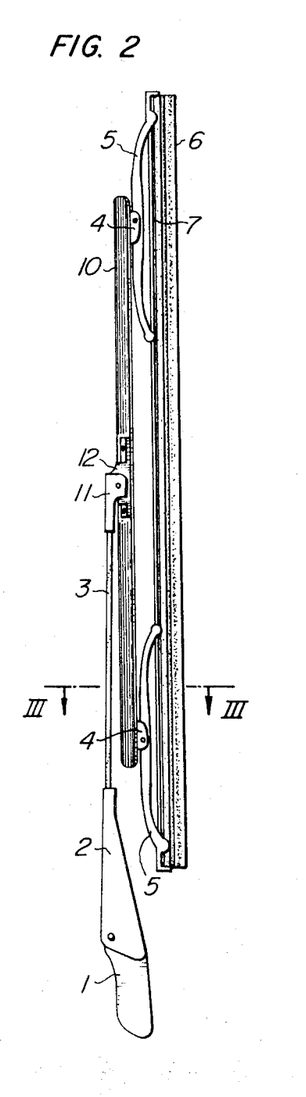
Figure 3:
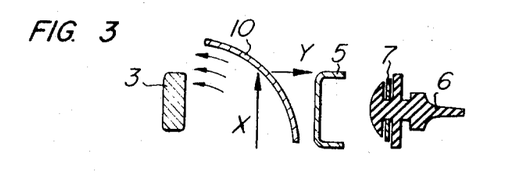
FIG. 3 is an enlarged and exploded sectional view thereof taken along the line III—III of FIG. 2.

The typical prior art windshield wiper is illustrated in FIGS. 1, 2 and 3. An arm piece 3 is securely fixed to a retainer 2 which in turn is rotatably fixed to an arm head 1. A blade assembly includes a first connection member 10 having second connection members 5 pivotably fixed thereto at both ends through brackets 4 and a clip 11 for pivotal connection with the arm assembly which is fixed to he first connection member 10 through a bracket 12. The second connection members 5 serve to retain for slidable movement in the longitudinal direction a resilient member 7 for retaining a blade 6 made of a rubber. Since the first and second connection members 10 and 5 and the arm piece 3 are located in relatively closely spaced apart relation with each other, the air resistance of the arm and blade assemblies is increased. Especially when a vehicle is travelling at high speed, the blade assembly tends to be moved away from the windshield glass by the air flowing along it so that the efficiency of the wiper is lowered. Furthermore, the prior art windshield wiper has many pivotal connections for example between the first and second connection members 10 and 5 and between the first connection member 10 and the clip 11 so that the greater noise tends to be produced. Since the arm assembly is connected with the blade assembly through the clip 11, the local concentration of force occurs at this point in cooperation so that the unbalanced motions among the connection members tend to occur. The noise is produced especially from the connection between the clip 11 and the arm piece 3, in this case. Since the first and second connection members 10 and 5 and the arm piece 3 are located in relatively closely spaced apart relation with each other as explained above, the driver's view tends to be limited. Furthermore, since the prior art windshield wiper comprises a large number of components, the assembly is complicated and the cost becomes higher. As shown in FIG. 3, in the prior art windshield wiper, the first connection member 10 is curved so that when the air flows in the direction indicated by the arrow X, it is redirected leftwardly by the connection member 10. The reaction force acting in the direction indicated by Y is therefore utilized to prevent the blade 6 from moving away from the windshield. However, the leftwardly directed air flow is intercepted by the arm piece 3 in practice and the windshield wiper is moved leftwardly in FIG. 3 away from the windshield so that the provision of the curved connection member 10 will not bring about the desired effect.

Figure 4:
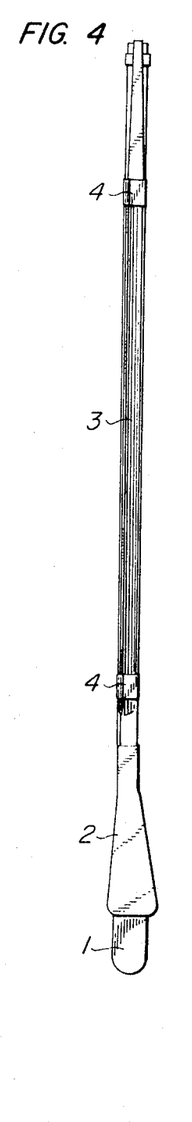
FIG. 4 and 5 are top and front views of a first embodiment of a windshield wiper in accordance with the present invention.
Figure 5:
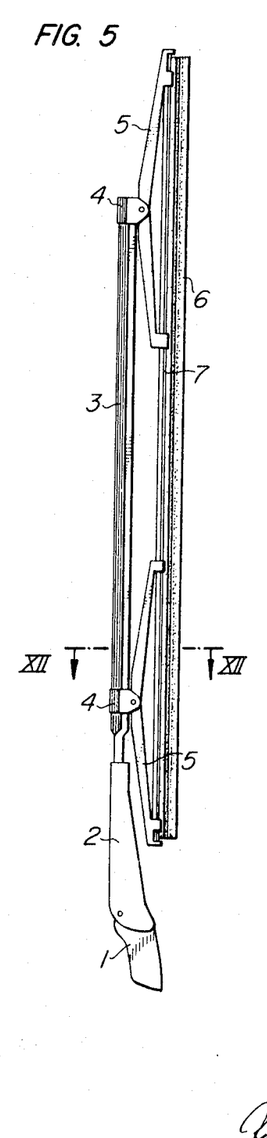

Referring to FIGS. 4 and 5 illustrating the first embodiment of the present invention, an arm bed 1 is coupled to a arm-drive shaft (not shown), and a retainer 2 securely fixed to the arm bed 1 has an arm piece 1 integrally formed with the retainer 2. The arm piece 3 whose arrangement is one of the novel features of the present invention is longer than the prior art arm piece, and has at both ends thereof two yoke members 5 pivotably fixed thereto through brackets 4 U-shaped in cross section. The yoke members 5 slidably hold a blade retaining, resilient member 7. The blade 6 attached to the member 7 is made of an elastic material such as rubber.

Since the first embodiment eliminates the first connection member 10 described with FIGS. 1, 2 and 3 in Prior Art and has the yoke members 5 which correspond to the second connection members in the prior art windshield wiper, directly coupled to the arm piece 3. It is seen that the first embodiment is simple in construction and the air resistance of the blade and arm is reduced so that the blade may be effectively prevented from being moved away from the windshield even when a vehicle travels at high speed. The elimination of the clip 11 shown in FIG. 2 for coupling the blade assembly with the arm assembly serves to reduce a number of connection or coupling members. In the first embodiment the arm assembly is connected to the blade assembly at two positions so that the concentration of force may be advantageously relaxed compared with the prior art windshield wiper and the unbalanced motions of the components may be effectively prevented. It is seen that the number of components may be reduced and the construction is simple, thereby facilitating the assembly.

Figure 6:
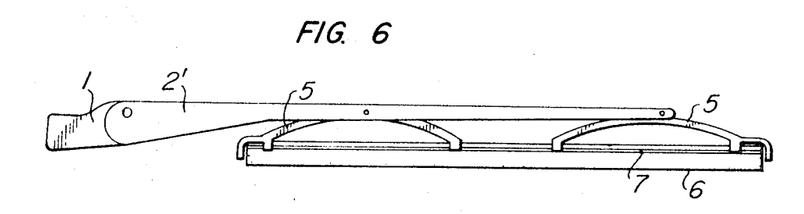
FIG. 6 is a front view of a second embodiment of the present invention.

The second embodiment (FIG. 6) is different from the first embodiment in that the retainer 2 is integrally formed with the arm piece 3 into a retainer 2'. The yoke members 5 are directly attached to the retainer 2'. It is readily seen that the second embodiment becomes simpler in construction, thereby facilitating the assembly and reducing the cost.

The third embodiment (FIGS. 7a and 7b) has a novel feature that the blade may be more effectively pressed against the windshield irrespective of its curvature.

When the windshield is flat, the angle formed between the arm piece 3 or retainer 2' and the windshield is maintained constant even when it oscillates. However, in case of a windshield of an automobile that is generally curved, the angle formed between the arm piece 3 or retainer 2' and the curved windshield will be of course varied so that the blade of the construction described above may be not uniformly pressed against the windshield. In the worst case, a portion of the blade 6 will be completely spaced apart from the windshield so that there remains a portion which is not wiped by the windshield wiper. The third embodiment was made to overcome this problem.

Figure 7A:
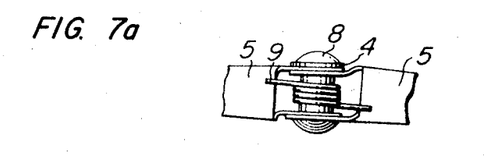
FIGS. 7a and b are fragmentary top and front views of a third embodiment of the present invention illustrating the attachment of a yoke member consisting of two sections to an arm piece.
Figure 7B:
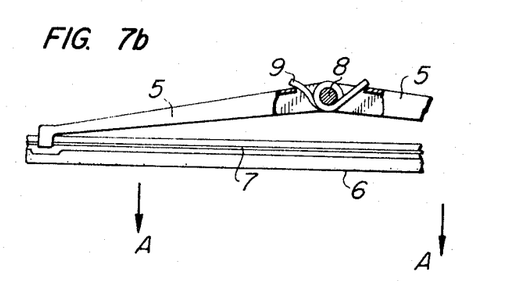

According to the present invention at least one of the yoke members 5 is in general divided into two sections as shown in FIG. 7. The two sections are rotatably carried by a pivot 8 extending through the bracket 4 which in turn is securely fixed to the arm piece 3 or retainer 2', so that each section may rotate independent of the other. As seen from FIG. 7, a coiled spring 9 carried by the pivot 8 has its both ends engaged with the outer surfaces of the two sections respectively so that they are normally biased in the direction indicating by the arrows A.

Figure 10:
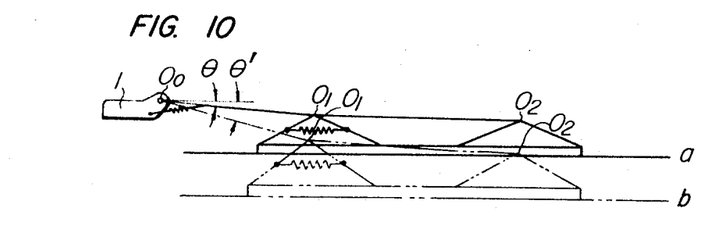
FIGS. 10 and 11 are diagrams for explanation of the working principle of the third, fourth and fifth embodiments illustrated in FIGS. 7, 8 and 9 respectively.
Figure 11:
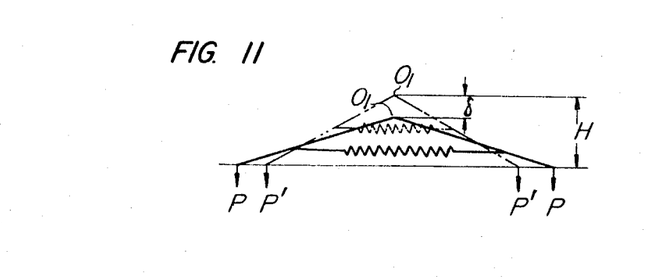

As shown in FIG. 10, the windshield is curved as schematically illustrated by the two lines $a$ and $b$. When the blade is moved from the surface indicated by the line $a$ to that indicated by the line $b$, the angle between the arm piece 3 and the arm bed 1 changes from $\theta$ to $\theta'$. The pivot $O_2$ at the free end of the arm piece 3 or retainer 2' is displaced by a height corresponding to that between the surfaces $a$ and $b$ and the height between the pivot $O_2$ and the windshield remains unchanged. On the other hand, the pivot $O_1$ closer to the retainer is displaced by a distance shorter than the difference in height between the surfaces $a$ and $b$ because the distance between the pivots $O_0$ and $O_1$ is shorter than that between the pivots $O_0$ and $O_2$. Therefore, the distance H between the pivot $O_1$ and the windshield is increased by $\delta$ at the surface $b$ compared with at the surface $a$ as shown in FIG. 11. Since the yoke member 5 consists of the two sections which are biased in the direction indicated by the arrow A, that is in the direction toward the windshield, by the coiled spring 9, the two sections are caused to move toward each other as shown by the two-dotted lines. In consequence, the blade on the side of pivot $O_1$ is firmly pressed against the windshield with a pressure P'.

When the spring constant of the coiled spring 9 is very small, the substantially same force is applied to the yoke member 5 so that the pressure P of the blade acting upon the surface $a$ will be substantially equal to the pressure P' at the surface $b$. Thus, the third embodiment may permit the blade to be uniformly pressed against the windshield even when the latter is curved.

Figure 8:
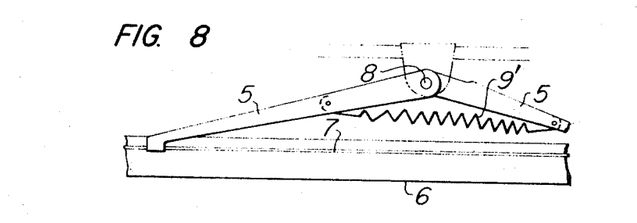
FIGS. 8 and 9 are fragmentary front views illustrating fourth and fifth embodiments of the present invention, which are variations of the third embodiment.
Figure 9:
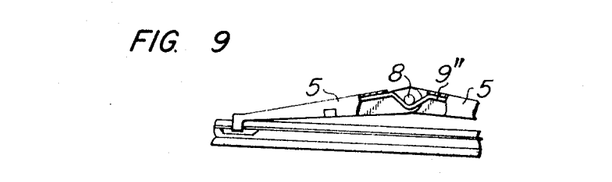

In the fourth and fifth embodiments of 2 present invention a tension spring 9' and a plate spring 9'' are respectively used in place of the coiled spring 9 in the third embodiment.

In the third, fourth and fifth embodiments described above, only one of the yoke members 5 has been shown as consisting of the two sections biased by the coiled, tension, or plate springs 9, 9' and 9'' toward the windshield, but it will be understood that both of the two yoke members 5 have the same construction. Furthermore, it will be also understood that more than two yoke members 5 may be provided if necessary.

The third, fourth and fifth embodiments have the feature that the blade may be uniformly pressed against the windshild even when it is curved, in addition to the features described with reference to the first and second embodiments.

Figure 12:
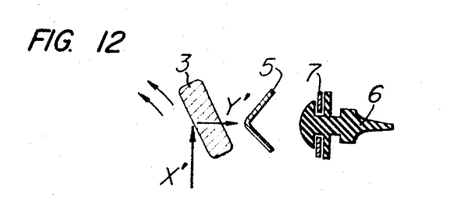
FIG. 12 is an exploded sectional view of a sixth embodiment of the present invention taken along the line XII—XII of FIG. 5.

In the sixth embodiment illustrated in FIG. 12, the arm piece 3 is inclined as shown, and has two yoke members of the type described attached to the both ends thereof through the brackets 4 U-shaped in cross section. Other constructions are similar to those in the first − fifth embodiments described above. The air flow X' is redirected leftwardly by the inclined arm piece 3 so that the reaction force acting in the direction indicated by Y' is produced so that the windshield wiper may be firmly pressed against the windshield and will not be moved away therefrom even at a high speed travel. Opposed to the prior art arrangement, the redirected air flow will not cause the wiper to move away from the windshield.

Figure 13:
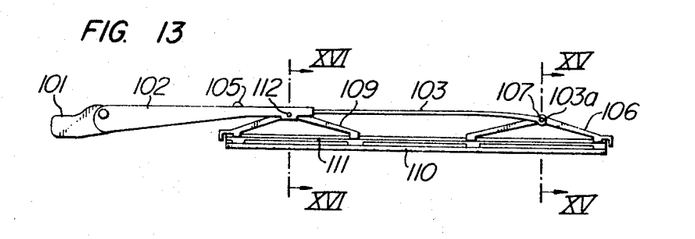
FIG. 13 is a front view thereof.
Figure 14:
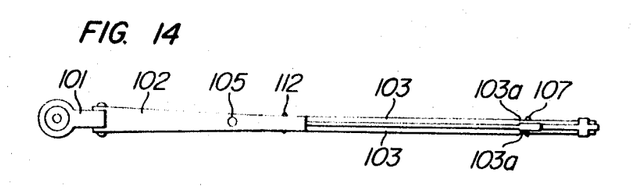
FIG. 14 is a top view thereof.
Figure 15:
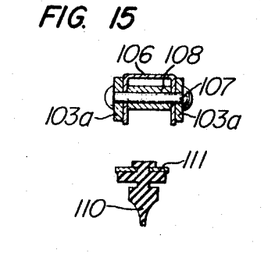
FIG. 15 is a sectional view taken along the line XV—XV of FIG. 13.
Figure 17:
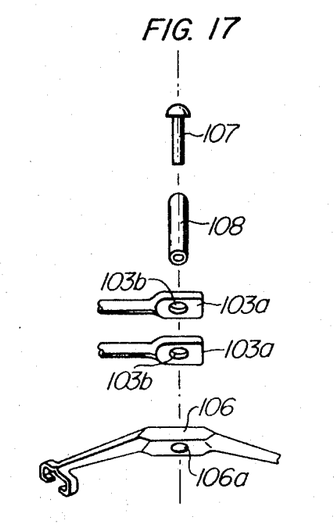
FIGS. 17 and 18 are exploded perspective views of the end of the arm piece.
Figure 18:
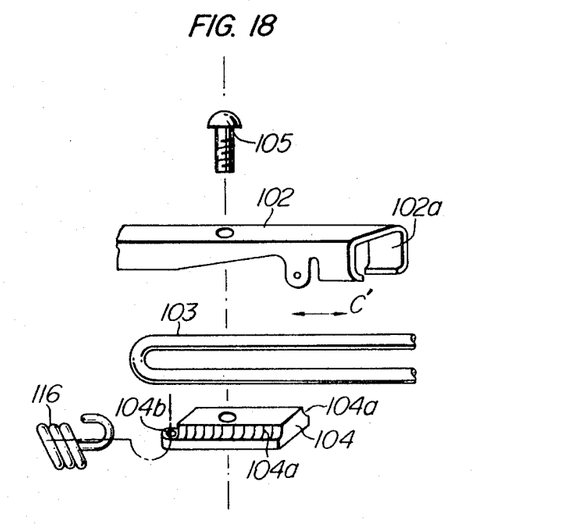

Referring to FIGS. 13 and 14, an arm head 101 coupled to an arm-drive shaft (not shown) has a retainer 102 pivotably fixed thereto. An arm piece 103 consists of a U-shaped bar whose bottom portion or side is best shown in FIG. 18 and is adapted to be fitted into the grooves 104a formed in the opposing side surfaces of a retaining member 104. Therefore, the arm piece 103 may be held securely in position between the opposing side walls of the channel shaped retainer 102 and the retaining member 104 by a screw 105 as best shown in FIG. 18. In order to more securely fix the arm piece 103 to the retainer 102, the pawl-like members are pressed against the arm piece 103 as shown in FIG. 18. As shown in FIG. 17, the free ends 103a of the arm piece 103 are flattened and provided with holes 103b. A yoke member 106 is pivotably fixed to the arm piece 103 by means of a rivet 107 which extends through the holes 103b and 106a formed through the yoke member 106. A collar 108 fitted over the rivet 107 is interposed between the bars of the arm piece 103 as best shown in FIG. 15. It is seen that the secure connection or joint is provided between the yoke member 106 and the arm piece 103 because of the above described arrangement.

Figure 16:
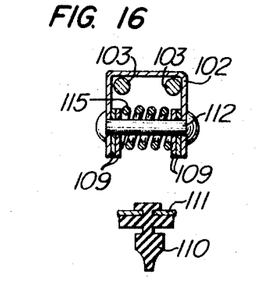
FIG. 16 is a sectional view taken along the line XVI—XVI of FIG. 13.

Referring to FIG. 16, blade 110 made of an elastic material such as rubber is securely fixed to a resilient member 111 which in turn is slidably carried by a yoke member 109. The yoke member 109 is pivotably fixed to the retainer 102 by means of a rivet 112.

Referring back to FIG. 18, one end of a spring 116 is engaged with a hole 104b of the retaining member 104 while the other end (not shown) is securely fixed to the arm head 101 so that the blade may be pressed against the windshield under the force of the spring 116.

As in the case of the first to fifth embodiments, the first connection member 10 in the prior art wiper is eliminated. The yoke members 106 and 109 are directly fixed to the arm piece 103 in place of the second connection members 5. The arrangement of the seventh embodiment is simple and the resistance of the blade as well as the arm is reduced. Furthermore, since the arm piece 103 comprises two parallel bars, its resistance is also reduced so that the blade may be prevented from being spaced apart from the windshield even at high speed. The clip 11 of the prior art wiper is eliminated so that a number of members which tend to produce noise may be reduced. Since the arm assembly is coupled to the blade assembly at two points, the concentration of force may be relaxed and the unbalanced motions of the members may be minimized. The total number of elements in the arrangements of this invention is less so that the assembly work is much facilitated compared with the prior art windshield wiper.

When the arm piece 103 is slidably fitted into the channel-like retainer 102 in both directions indicated by the double-pointed arrow C' in FIG. 18, the arm piece 103 may be moved by loosening the screw 105 and guided by the grooves 104a of the retaining member 104 and the pawl-like members 102a so as to adjust the length of the arm piece 103. Therefore, the windshield wiper in accordance with the present invention may be applied to any windshield of any dimensions. It is seen therefore that the present invention provides a windshield wiper which is adapted for mass production at less cost.

In order to prevent the blade from being spaced apart from the windshield when the latter is curved, the principle of the third, fourth and fifth embodiments described with reference to FIGS. 7 – 11 may be also applied to the instant embodiment (FIGS. 13–18). That is, the yoke member 109 is divided into the two sections and a spring 115 is loaded therebetween so as to bias them toward the windshield as shown in FIG. 16.

Figure 19:
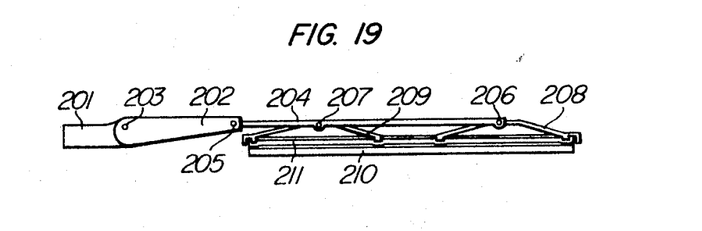
FIG. 19 is a front view thereof.
Figure 20:
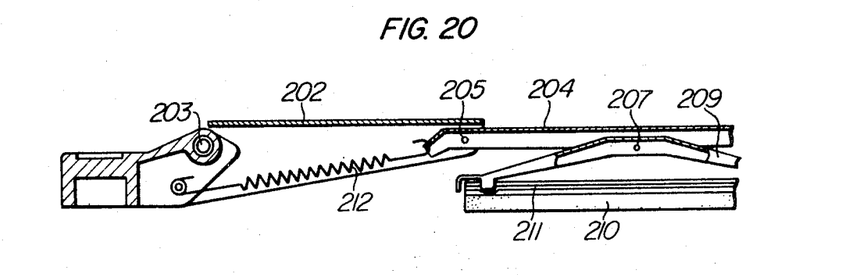
FIG. 20 is a fragmentary sectional view thereof.

In the eight embodiment illustrated in FIGS. 19 and 20, an arm head 201 coupled to an arm-drive shaft (not shown) has a retainer 202 pivotably fixed thereto through a pivot 203. An arm piece 204 U-shaped in cross section is pivotably fixed to the retainer 202 by means of a pivot 205. As in the case of the first embodiment, the arm piece 204 is made longer that the conventional one and has two yoke members 208 and 209 pivotably fixed to both ends thereof through pivots 206 and 207 respectively. A blade 210 is securely retained by a resilient member 211 which in turn is slidably carried by the yoke members 208 and 209. One end of a tension spring 212 is fixed to the arm head 201 while the other, to the arm piece 204 as shown in FIG. 20 so that the blade 210 may be pressed against the windshield.

The eight embodiment has the same advantages as those of the first – seventh embodiments described above. In particular the eighth embodiment has the same advantage as that of the third, fourth and fifth embodiments. That is, the blade may be uniformly pressed against the windshield even when the latter is curved.

Figure 21:
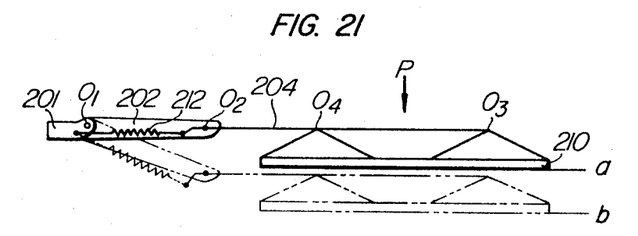
FIGS. 21 and 22 are diagrammatic views illustrating the working principle of the eighth embodiment.

Referring to FIG. 21, when the wiper is displaced from the surface $a$ to the surface $b$, the blade 210 is exerted with the pressure P under the force of the spring 212. Therefore, when the retainer 202 is made integral with the arm piece 204, only the leading portion on the side of the pivot 206 of the blade 210 may contact with or follow the curved windshield, but the portion of the blade 210 on the side of the pivot 207 is moved away from the windshield. However, according to the present invention shown in FIG. 20 the arm piece 204 is rotatably fixed to the retainer 202 through the pivot 205 and one end of the spring 212 is fixed to the arm piece 204 as explained above.

Figure 22:
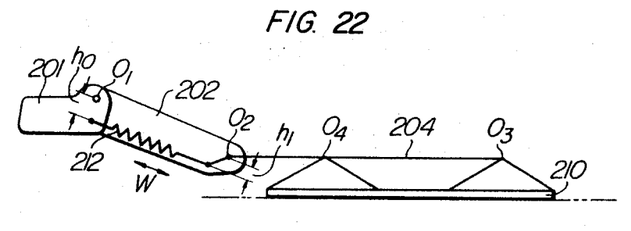

Referring to FIG. 22, we assume that the centers of the pivots 203, 205, 206 and 207 shown in FIG. 19 be $0_1$, $0_2$, $0_3$, and $0_4$ respectively; the distance between the point $0_1$ and the line of action of the spring 212 is $h_0$ cm; the distance between the point $0_2$ and the line of action of the spring 212 is $h_1$ cm; and the tensile strength of the spring 212 is W kg. The moment about the point $0_1$ which is equal to $W h_0$ is made greater than the moment $W h_1$ about the point $0_2$. Then, as shown in FIG. 22, the arm piece 204 is bent at the pivot 205 relative to the retainer 202 so that the portion on the side of the pivot 207 of the blade 210 may be displaced by a difference between the heights of the surface $a$ and $b$. When the moment $W h_1$ about the point $0_2$ is too great, the portion on the side of the pivot 206 of the blade 210 presses the windshield with a greater pressure as shown in FIG. 23 B. This phenomenon is also observed when the retainer 202 is made integral with the arm piece 204. On the other hand when the moment $W h_1$ about the point $0_2$ is too small, the load is concentrated toward the portion closer to the arm piece 204, that is the portion on the side of the pivot 207 of the blade 210 as shown in FIG. 23 C.

Figure 23A:
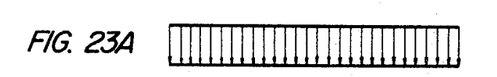
FIG. 23 shows the graphs illustrating the distribution of the pressure exerted by the blade to the windshield for explanation of the eighth embodiment.
Figure 23B:
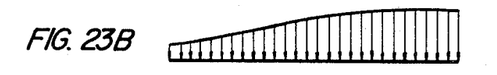
Figure 23C:
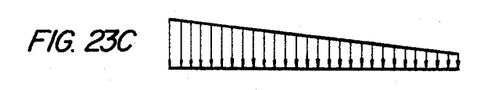

Thus, it is readily seen that when the distance $h_1$ is suitably adjusted, the blade 210 may be pressed against the windshield uniformly as shown in FIG. 23 A even when the windshield is curved.

What is claimed is:

1. A windshield wiper comprising a blade made of an elastic material, two separate yoke members for supporting said blade, and an arm member, each of said yoke members being directly, pivotably and removably attached at two different points on the arm member.

2. A windshield wiper as defined in claim 1 wherein a yoke member remote from the tip of the arm member is divided into two sections between which is loaded a spring so as to normally bias said two sections of said yoke member toward the windshield.

3. A windshield wiper as defined in claim 1 wherein a part of the cross-sectional configuration of said arm member is so inclined that the blade is biased toward the air flow produced when a vehicle travels.

4. A windshield wiper as defined in claim 1 wherein said arm member comprises an arm head, a retainer pivotably fixed to said arm head and an arm piece fixed to said retainer.

5. A windshield wiper as defined in claim 4 wherein said arm piece comprises two solid wires having circular cross-sections.

6. A windshield wiper as defined in claim 4 wherein said arm piece is rotatably fixed to said retainer, and a tension spring is loaded between said arm head and said arm piece so that said blade may be pressed against the windshield under the force of said spring.

* * * * *

UNITED STATES PATENT OFFICE
CERTIFICATE OF CORRECTION

Patent No. 3,665,544　　　　　　　Dated May 30, 1972

Inventor(s) Kashira SAKAMOTO

It is certified that error appears in the above-identified patent and that said Letters Patent are hereby corrected as shown below:

In the heading under "Foreign Applications Priority Data" read the first two claimed priorities as: --December 27, 1969, Japan 45/1167 and December 27, 1969, Japan 45/1168--

Signed and sealed this 2nd day of January 1973.

(SEAL)
Attest:

EDWARD M. FLETCHER, JR.　　　　　　　ROBERT GOTTSCHALK
Attesting Officer　　　　　　　　　　Commissioner of Paten